US009884380B2

(12) United States Patent
Muti et al.

(10) Patent No.: US 9,884,380 B2
(45) Date of Patent: Feb. 6, 2018

(54) SAW BLADE WITH MULTIPLE TANGS

(71) Applicant: BLACK & DECKER INC., Newark, DE (US)

(72) Inventors: David Muti, Nottingham, MD (US); David Brutscher, Louisville, KY (US); Malek George, Valrico, FL (US); John Wells, Eminence, KY (US)

(73) Assignee: Black & Decker Inc., New Britain, CT (US)

( * ) Notice: Subject to any disclaimer, the term of this patent is extended or adjusted under 35 U.S.C. 154(b) by 70 days.

(21) Appl. No.: 14/737,588

(22) Filed: Jun. 12, 2015

(65) Prior Publication Data

US 2015/0367434 A1   Dec. 24, 2015

Related U.S. Application Data

(60) Provisional application No. 62/014,774, filed on Jun. 20, 2014.

(51) Int. Cl.
| | |
|---|---|
| *B26F 1/24* | (2006.01) |
| *B26B 1/00* | (2006.01) |
| *B26D 7/26* | (2006.01) |
| *B23D 61/12* | (2006.01) |

(Continued)

(52) U.S. Cl.
CPC ........... *B23D 61/123* (2013.01); *B23D 49/10* (2013.01); *B23D 51/10* (2013.01); *Y10T 83/935* (2015.04)

(58) Field of Classification Search
CPC ........ B23D 49/10; B23D 51/10; B23D 61/23; B23D 61/12; Y10T 83/935

USPC ........ 83/835–855, 660, 698.61; 30/392–394, 30/329, 355, 350, 369, 514, 517
See application file for complete search history.

(56) References Cited

U.S. PATENT DOCUMENTS

| | | | |
|---|---|---|---|
| 1,181,529 A | * | 5/1916 | Hutton ................. B23D 61/023 76/112 |
| 1,734,554 A | | 11/1929 | Behrman |
| 2,335,141 A | | 11/1943 | Blum |

(Continued)

FOREIGN PATENT DOCUMENTS

| | | |
|---|---|---|
| DE | 8603266 U1 | 7/1987 |
| DE | 29607673 U1 | 10/1997 |

(Continued)

OTHER PUBLICATIONS

Chariot, David—European Search Report re: EP15172989.4—dated Oct. 16, 2015—7 pages—The Hague.

(Continued)

Primary Examiner — Ghassem Alie
Assistant Examiner — Bharat C Patel
(74) Attorney, Agent, or Firm — Scott B. Markow

(57) ABSTRACT

A saw blade includes an elongated body having a front end, a rear end, an elongated cutting edge extending between the front edge and the rear edge and defining a longitudinal axis, and a back edge opposite the cutting edge. A first tang is coupled to the rear end of the body and configured to couple the saw blade to a saw. The first tang faces a rearward direction away from the front end of the body. A second tang is defined in an intermediate portion of the body and configured to couple the saw blade to a saw. The second tang also faces the rearward direction. The second tang can be exposed by breaking off a portion of the body.

24 Claims, 9 Drawing Sheets

(51) Int. Cl.
*B23D 51/10* (2006.01)
*B23D 49/10* (2006.01)

(56) References Cited

U.S. PATENT DOCUMENTS

| | | | |
|---|---|---|---|
| 3,448,518 A | 6/1969 | Sklar | |
| 3,630,699 A * | 12/1971 | Catlin | B23D 65/00 451/356 |
| 3,929,050 A | 12/1975 | Salzwedel | |
| 3,946,778 A | 3/1976 | Knuth | |
| 4,233,734 A | 11/1980 | Bies | |
| 4,322,885 A | 4/1982 | Osada | |
| 4,499,936 A | 2/1985 | Nilsson | |
| 4,794,692 A | 1/1989 | Wang | |
| 4,835,869 A | 6/1989 | Waldherr | |
| 5,062,338 A | 11/1991 | Baker | |
| 5,103,564 A * | 4/1992 | MacDonald | B26B 9/00 30/346.61 |
| 5,103,565 A | 4/1992 | Holzer, Jr. | |
| 5,125,927 A * | 6/1992 | Belanger | A61B 18/1402 606/45 |
| 5,509,339 A | 4/1996 | Grant | |
| 5,573,255 A | 11/1996 | Salpaka | |
| 5,706,583 A | 1/1998 | Gengenbach | |
| 5,706,585 A | 1/1998 | Wang | |
| 5,896,799 A | 4/1999 | Chen | |
| 6,105,482 A | 8/2000 | Garcia et al. | |
| 6,129,617 A | 10/2000 | Adams | |
| 6,401,585 B1 | 6/2002 | Morgan | |
| 6,457,468 B1 | 10/2002 | Goldberg | |
| 6,718,640 B1 | 4/2004 | John | |
| D506,113 S | 6/2005 | Snape et al. | |
| 7,174,644 B2 | 2/2007 | Critelli et al. | |
| D608,168 S | 1/2010 | Green | |
| D628,453 S | 12/2010 | Green | |
| 7,921,568 B2 | 4/2011 | Green | |
| D644,896 S | 9/2011 | Green | |
| 8,161,654 B2 | 4/2012 | Green | |
| D660,107 S | 5/2012 | Green | |
| 8,413,339 B2 * | 4/2013 | Ranieri | B26B 5/002 30/162 |
| 8,926,410 B2 | 1/2015 | Kalomeris et al. | |
| 9,132,492 B2 | 9/2015 | Butzen et al. | |
| 2004/0139617 A1 * | 7/2004 | Neshat | A22B 3/10 30/355 |
| 2005/0235799 A1 | 10/2005 | Hampton et al. | |
| 2006/0086218 A1 | 4/2006 | Quinn | |
| 2007/0056427 A1 | 3/2007 | Males | |
| 2008/0307936 A1 | 12/2008 | Elliston et al. | |
| 2010/0071216 A1 * | 3/2010 | Novak | B26B 9/02 30/162 |
| 2010/0218389 A1 | 9/2010 | Kalomeris et al. | |
| 2012/0144680 A1 * | 6/2012 | Scillia | B23K 26/0087 30/350 |
| 2013/0032016 A1 * | 2/2013 | Butzen | B23D 61/125 83/39 |
| 2013/0239415 A1 | 9/2013 | Wagner | |

FOREIGN PATENT DOCUMENTS

| | | |
|---|---|---|
| DE | 202004016449 U1 | 1/2005 |
| EP | 1970149 A1 | 9/2008 |
| EP | 2087960 A1 | 8/2009 |
| GB | 2443252 A | 4/2008 |
| JP | 61111807 A | 5/1986 |
| JP | 2002018639 A | 1/2002 |
| WO | 2010035297 A1 | 4/2010 |

OTHER PUBLICATIONS

Copenheaver—International Search Report and Written Opinion—dated Apr. 29, 2010—3 pages—USPTO—Alexandria, Virginia.

* cited by examiner

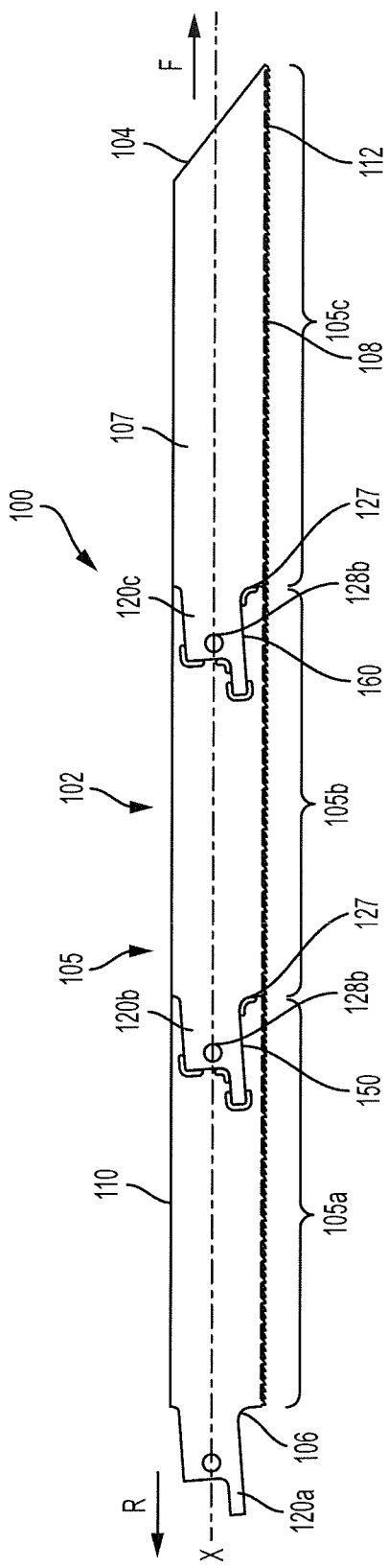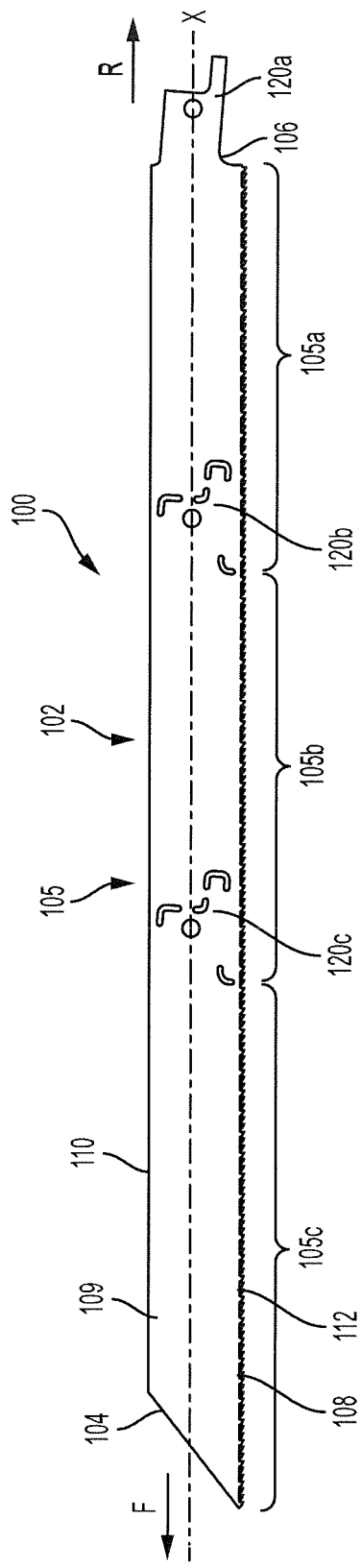
FIG. 1A
FIG. 1B

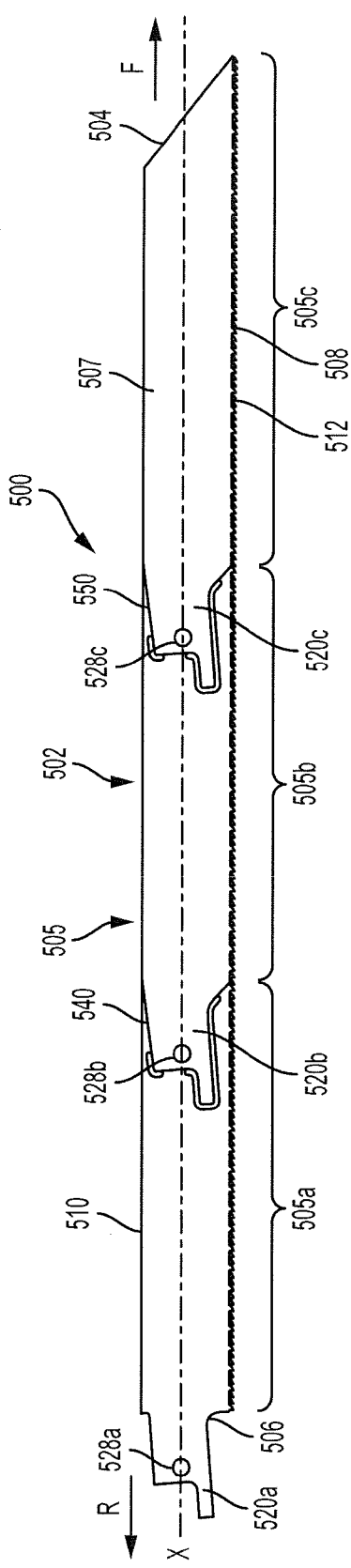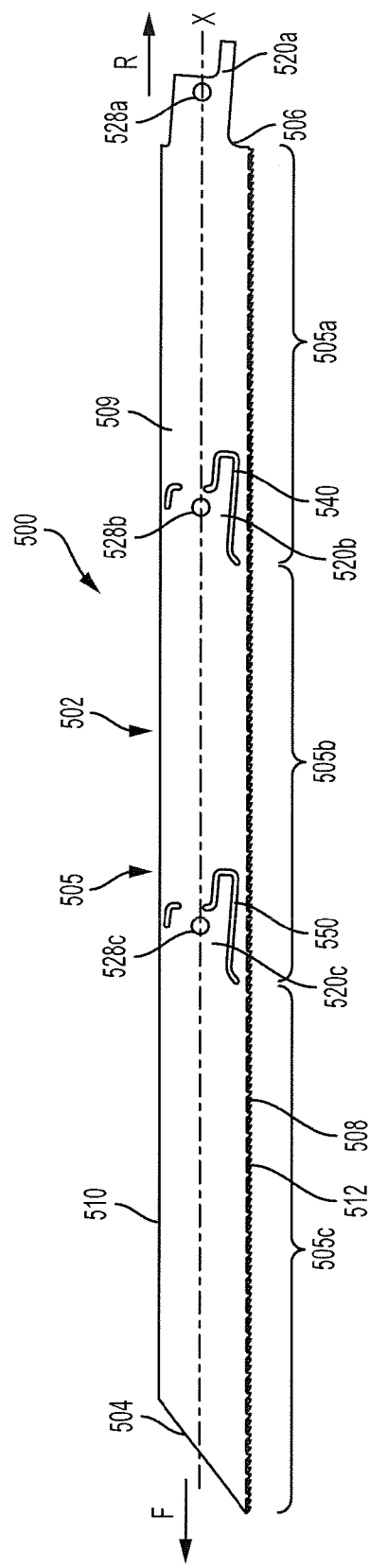
FIG. 5A
FIG. 5B

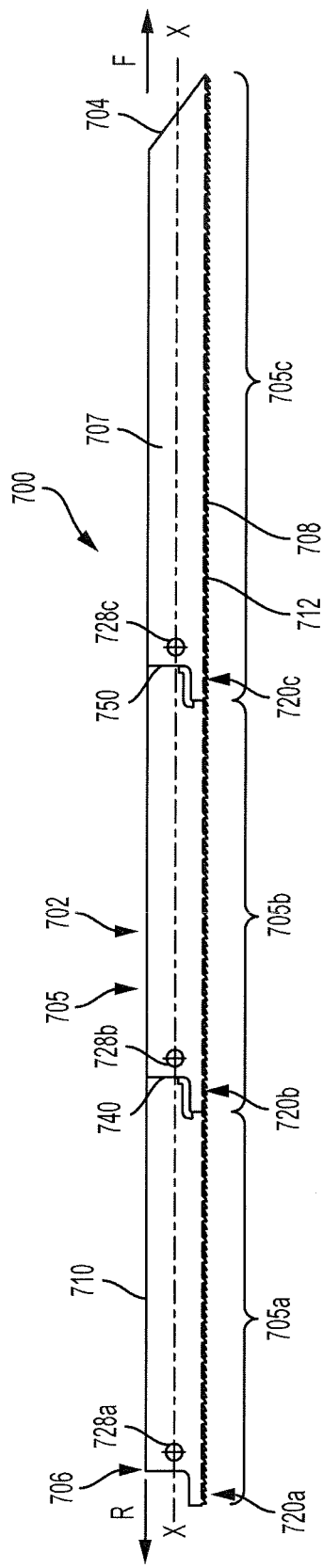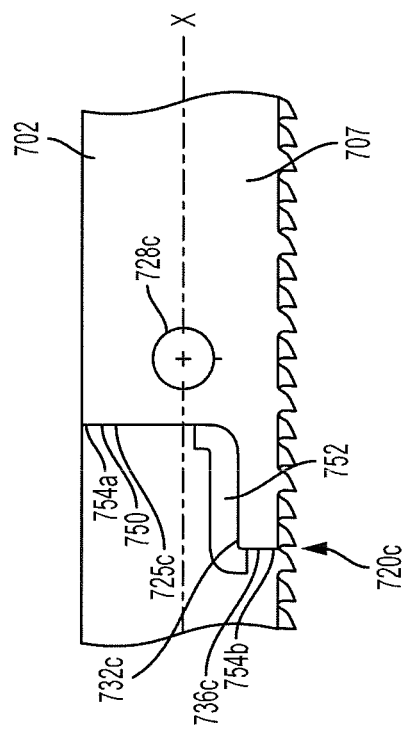
FIG. 7A
FIG. 7C

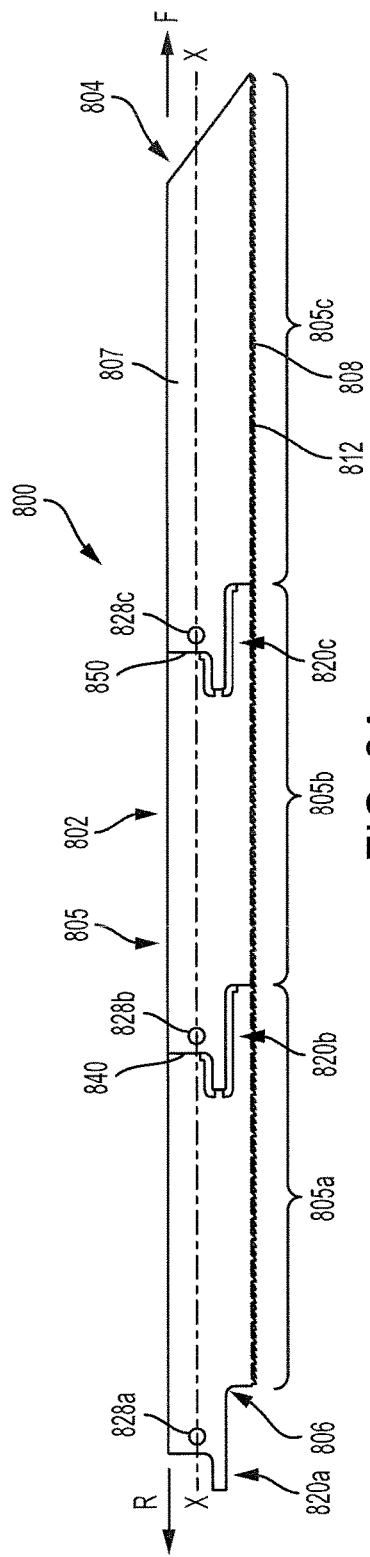
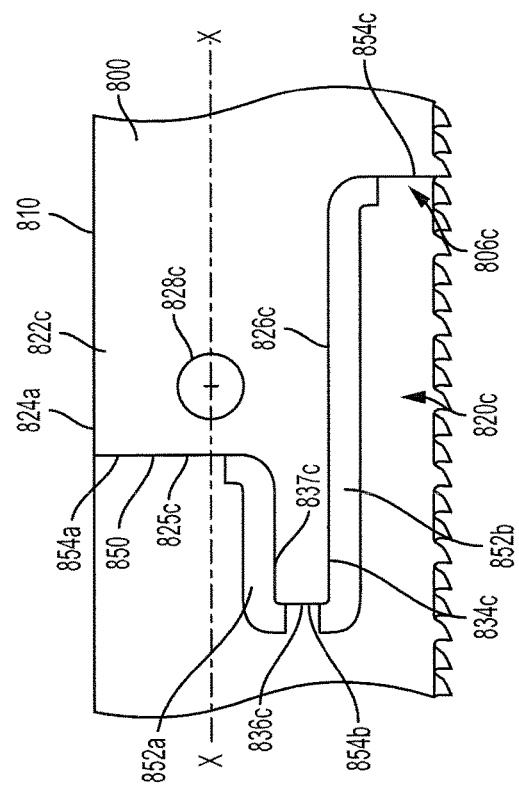
FIG. 8A
FIG. 8C

SAW BLADE WITH MULTIPLE TANGS

RELATED APPLICATIONS

This application claims priority, under 35 U.S.C. § 119(e), to U.S. Provisional Patent Application No. 62/014,774, filed Jun. 20, 2014, titled "Saw Blade with Multiple Tangs," which is incorporated by reference.

TECHNICAL FIELD

This application relates to a saw blade with multiple tangs for use in a reciprocating saw.

BACKGROUND

A traditional reciprocating saw blade includes a blade body, a front end, a rear end with a tang for attaching the saw blade to a reciprocating saw, a cutting edge extending between the front end and having a plurality of teeth, and a back edge extending between the front end and the rear end opposite the cutting edge. In use, the portion of the cutting edge closest to the tang tends to be used the most, so that this portion of the cutting edge wears faster than portions of the cutting edge further removed from the tang. Thus, the useful life of the saw blade tends to be dictated by faster wear on the rearmost portion of the cutting edge. It would be desirable to extend the life of such saw blades by making use of all portions of the cutting edge.

SUMMARY

In an aspect, a saw blade includes an elongated body having a front end, a rear end, an elongated cutting edge extending between the front end and the rear end and defining a longitudinal axis, and a back edge opposite the cutting edge. A plurality of teeth is disposed along the elongated cutting edge. The teeth are configured to cut a workpiece when the cutting edge is moved in a first direction substantially along the longitudinal axis and not to cut a workpiece when the cutting edge is moved in a second opposite direction substantially along the longitudinal axis. A first tang is coupled to the rear end and configured to couple the saw blade to a saw. A second tang defined in an intermediate portion of the body, and can be exposed by breaking off a first portion of the body.

In another aspect, a saw blade includes an elongated body having a front end, a rear end, an elongated cutting edge extending between the front edge and the rear edge and defining a longitudinal axis, and a back edge opposite the cutting edge. A first tang is coupled to the rear end, facing a rearward direction and configured to couple the saw blade to a saw. A second tang is defined in an intermediate portion of the body and also facing the rearward direction. The second tang can be exposed by breaking off a portion of the body.

In another aspect, a saw blade includes an elongated body having a front end, a rear end, an elongated cutting edge extending between the front edge and the rear edge and defining a longitudinal axis, and a back edge opposite the cutting edge. A first tang is coupled to the rear end and is configured to couple the saw blade to a saw. A second tang is defined in an intermediate portion of the body and is configured to couple the saw blade to a saw. The second tang can be exposed by breaking off a portion of the body that includes the first tang.

In another aspect, a saw blade includes an elongated body having a front end, a rear end, an elongated cutting edge extending between the front edge and the rear edge and defining a longitudinal axis, and a back edge opposite the cutting edge. A first tang is coupled to the rear end and configured to couple the saw blade to a saw. A second tang is defined in an intermediate portion of the body. The second tang is defined by a score in the body that has a first portion that extends through the body and a second portion that does not extend through the body. The second tang can be exposed by breaking off a portion of the body along the score.

In another aspect, a saw blade includes an elongated body bounded by a front end, a rear end, an elongated cutting edge extending between the front edge and the rear edge and defining a longitudinal axis, and a back edge opposite the cutting edge. A first tang is coupled to the rear end and is configured to couple the saw blade to a saw. A plurality of additional tangs is defined in an intermediate portion of the body. Each additional tang can be exposed by breaking off an adjacent portion of the body that extends from the additional tang toward the rear end of the body.

Implementations of these aspects may include one or more of the following features.

The intermediate portion may include a first intermediate portion and a second intermediate portion forward of the first intermediate portion. The first intermediate portion may include the first tang. The second tang may be disposed at a junction between the first and second intermediate portions. The first intermediate portion may be rearward of the second tang. The first intermediate portion may include the rear end of the body.

The plurality of teeth may cut a workpiece only when the cutting edge is moved in a rearward along the longitudinal axis. The first tang and the second tang each may extend in a rearward direction relative to the body. A third tang may be defined at a junction between the second intermediate portion and a third intermediate portion of the body. The third tang can be exposed by breaking off the second intermediate portion of the body. The second intermediate portion may be rearward of the third tang.

The second tang and/or the third tang may be defined by scores in the body. Each score may include a through-slot that extends through the body and a groove that does not extend through the body. Each score may include a plurality of through-slots that extend through the body and a plurality of grooves that do not extend through the body.

Advantages may include one or more of the following. The score(s) that define(s) the second, third, etc. tang(s) may provide sufficient structural strength to avoid inadvertent breakage of the saw blade along the score(s) during cutting, but allow the second, third, etc. tang(s) to be exposed by breaking off the adjacent rearward intermediate portion without the use of additional tools. The additional tang(s) in the intermediate portion increases the life of the saw blade by enabling the cutting edge closest to each tang in the forward direction to be used after the cutting edge rearward of the tang has been worn out. These and other advantages and features will be apparent from the description, the drawings, and the claims.

BRIEF DESCRIPTION OF THE DRAWINGS

FIG. 1A is a front side view of a first embodiment of a saw blade.

FIG. 1B is a back side view of the saw blade of FIG. 1A.

FIG. 5A is a front side view of a second embodiment of a saw blade.

FIG. 5B is a back side view of the saw blade of FIG. 5A.

FIG. 7A is a front side view of a third embodiment of a saw blade.

FIG. 7C is a close up view of a score of the saw blade of FIG. 7A.

FIG. 8A is a front side view of a fourth embodiment of a saw blade.

FIG. 8C is a close up view of a score of the saw blade of FIG. 8A.

DETAILED DESCRIPTION

Figure 2:
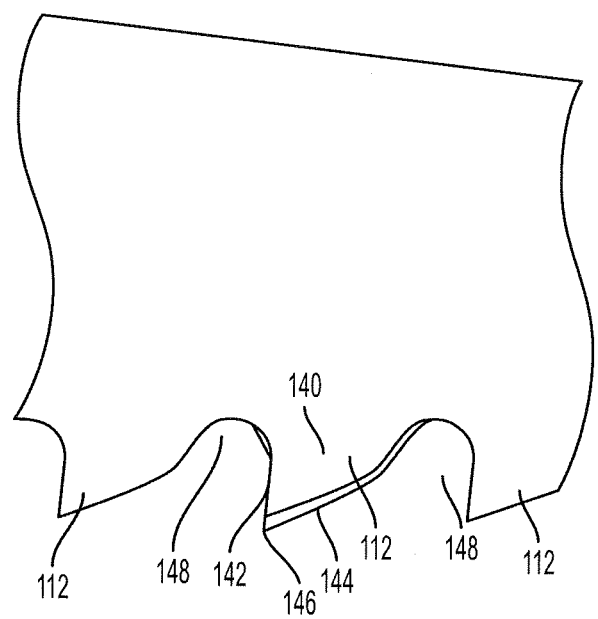
FIG. 2 is a close up view of a tang of the saw blade of FIG. 1A.

Referring to FIGS. 1A and 1B, in a first embodiment a saw blade 100 includes an elongated body 102 having a front end 104 facing a frontward direction F, a rear end 106 facing a rearward direction R, and an intermediate portion 105. The intermediate portion 105 includes first, second and third intermediate portions 105a, 105b, and 105c. The blade body has a top face 107, as shown in FIG. 1A, and a bottom face 109 as shown in FIG. 1B. An elongated cutting edge 108 having a plurality of teeth 112 extends between the front end 104 and the rear end 106 and defines a longitudinal axis X. A back edge 110 extends between the front end 104 and the rear end 106 opposite the cutting edge 108. The saw blade 100 is configured to cut material when the cutting edge 108 is moved in a reciprocating manner. For example, the saw blade 100 may be a reciprocating saw blade, a jigsaw blade, and/or a band saw blade.

Referring also to FIG. 2, each of the plurality of teeth 112 includes a tooth body 140 with a rearward facing rake face 142 and a frontward facing relief face 144 that meet at a tip 146. A gullet 148 is defined between each pair of adjacent teeth. The rake face 142 of each tooth 112 is configured to cut a workpiece, while the relief face 144 of each tooth is configured not to cut the workpiece. Thus, the cutting edge 110 is uni-directional so that the teeth cut into a workpiece only when the blade is moved in a rearward direction R relative to the workpiece, and not when the blade is moved in a frontward direction F relative to the workpiece. The teeth and gullets may have the configuration disclosed in U.S. patent application Ser. No. 12/261,186, filed Oct. 30, 2008, titled "Reciprocating Saw Blade with Plunge Nose," which is incorporated by reference.

In alternative embodiments, the cutting edge may be unidirectional so that the teeth cut into a workpiece only when the blade is moved in the frontward direction F, or the cutting edge may be bi-directional so that the teeth cut into a workpiece when the saw blade is moved in both the rearward direction R and the frontward direction F. In other alternative embodiments, the teeth and/or gullets may have different shapes, sizes, and/or dimensions, and may be unset or set in a desired pattern of left, right, and unset or raker teeth. In another alternative embodiment, the cutting edge may have no teeth, but instead may comprise a straight edge with diamond or carbide grit for cutting.

Figure 3:
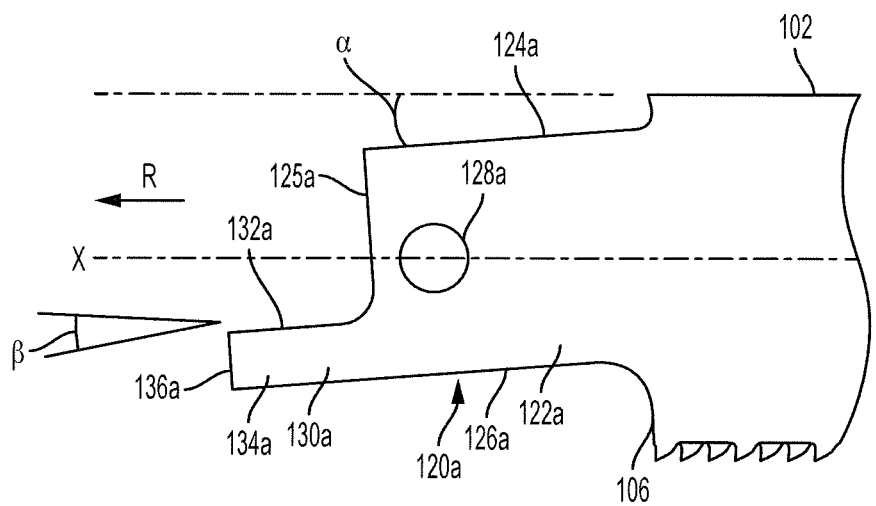
FIG. 3 is a close up view of a portion of the cutting edge of the saw blade of FIG. 1A.

Referring also to FIG. 3, a first tang 120a is coupled to and extends rearward from the rear end 106 of the body 102. The illustrated embodiment, the first tang 120a has a body portion 122a defined by a first top edge 124a, a substantially parallel first bottom edge 126a, and a first rear edge 125a. The first top edge 124a and the first bottom edge 126a extend in the rearward direction R from the body 102 and each may be at an angle α of approximately 0 to approximately 8 degrees relative to the longitudinal axis X. A round opening 128a extends through the body portion 122a of the first tang 120a. The first tang 120a further includes a panhandle portion 130a extending in the rearward direction R from the body portion 122a and defined by a second top edge 132a, a second bottom edge 134a substantially parallel to the top edge 132a, and a rear edge 136a extending between the second top edge 132a and the second bottom edge 134a. The second top edge 132a and the second bottom edge 134a each may be at an angle β of approximately 0 to approximately 8 degrees relative to the longitudinal axis X. The first bottom edge 126a and the second bottom edge 134a may be collinear with each other.

The first tang 120a may have a configuration like the tang of the reciprocating saw blade disclosed in the aforementioned U.S. patent application Ser. No. 12/261,186, which is incorporated by reference. The first tang 120a is oriented to face in the rearward direction R and is configured to couple the saw blade to a powered reciprocating saw, such as the saw disclosed in U.S. Pat. No. 7,437,824, which is incorporated by reference. In other embodiments, the first tang may have other configurations, such as the tang of the jigsaw blade disclosed in U.S. patent application Ser. No. 12/327,145, filed Dec. 3, 2008, titled "Jigsaw Blade," which is incorporated by reference.

Referring to FIGS. 1A and 1B, a second tang 120b, having the same configuration as the first tang 120a, is defined in the intermediate portion 105 of the saw blade body 102 at a junction between the first intermediate portion 105a and the second intermediate portion 105b. A third tang 120c, also having the same configuration as the first tang 120a, is defined in the intermediate portion 105 of the saw blade body 102 at a junction between the second intermediate portion 105b and the third intermediate portion 105c. Each of the second tang 120b and the third tang 120c is oriented to face in the rearward direction R.

Figure 4A:
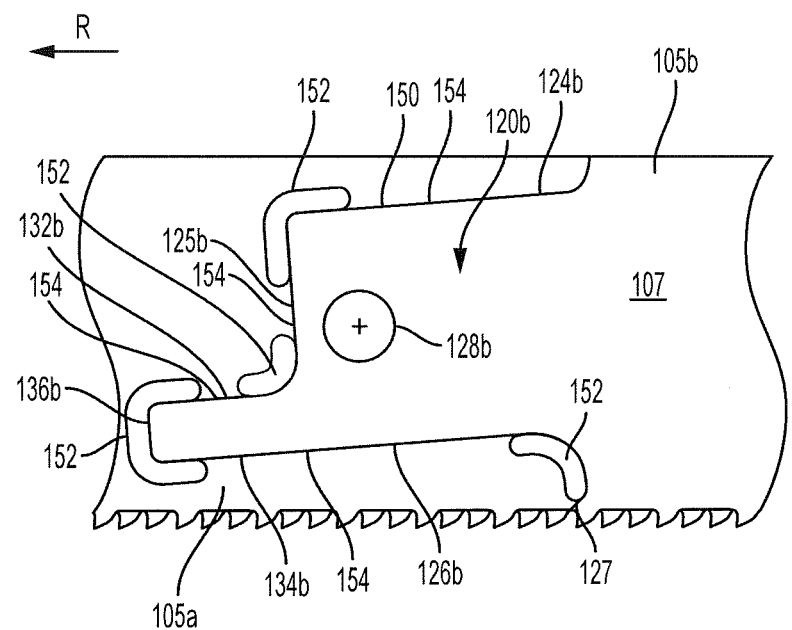
FIG. 4A is a front close up view of a score of the saw blade of FIG. 1A.
Figure 4B:
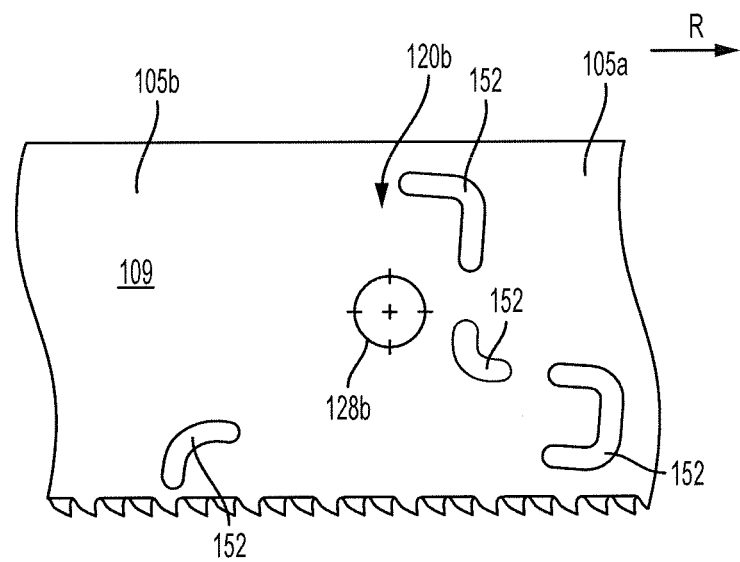
FIG. 4B is a rear close up view of the score of the saw blade of FIG. 1A.

Referring also to FIGS. 4A and 4B, the edges of the second tang 120b and of the third tang 120c are defined by scores 150, 160 located at junctions between the first intermediate portion 105a and the second intermediate portion 105b and between the second intermediate portion 105b and the third intermediate portion 105c. Each score 150, 160 includes one or more through-slots 152 that extend completely through the blade body 102 from the top face 107 to the bottom face 109, and one or more non-through-grooves 154 defined in the top face 107 but that do not extend through the blade body 102 to the bottom face 109. Each score 150, 160 allows a user to break off and remove the first intermediate portion 105a from the second intermediate portion 105b and/or the second intermediate portion 105b from the third intermediate portion 105c, without the use of any additional tools, to expose the second tang 120b and/or the third tang 120c, when desired.

The first score 150 and the second score 160 divide the saw blade body 102 into approximately equal thirds. In other embodiments, the scores 150, 160 may divide the blade body 102 into unequal thirds. In addition, there may be a different number of scores that define a different number of tangs, and that divide the saw blade body into a different number of sections. Alternatively, the scores may also define tangs having different sizes and/or configurations from one another.

The through-slots 152 and the non-through-grooves 154 of each of the scores 150, 160 are configured so that the scores 150, 160 are structurally strong enough to prevent unintentional breakage and/or separation of the first, second, and/or third intermediate portions 105a, 105b, 105c from one another during sawing, and structurally weak enough to enable a user to break off and remove the first, second, and/or third intermediate portions 105a, 105b, 105c from one another, without the use of any additional tools, to expose the second tang 120b and/or the third tang 120c. In the embodiment shown in FIGS. 4A and 4B, the through-slots 152 are located at corners or junctions between: (i) a first top edge 124b and a first rear edge 125b of the tang; (ii) a first rear edge 125b and a second top edge 132b of the tang; (iii) a second top edge 132b and a second rear edge 136b of the tang; (iv) a second rear edge 136b and a second bottom edge 134b of the tang; and (v) a first bottom edge 126b of the tang and the rear end 127 of the adjacent intermediate portion 105b, 105c. The non-through-grooves 154 are located along straight edges of: (i) the first top edge 124b of the tang; (ii) the second top edge 132b of the tang; (iii) the second bottom edge 134b of the tang; (iv) the first bottom edge 126a of the tang; and (v) the rear end 127 of the adjacent intermediate portion 105b, 105c.

In use, the first tang 120a may be used to couple the saw blade 100 to a saw, such as a reciprocating saw, that cuts a workpiece by moving the saw blade 100 in a reciprocating manner. While cutting with the first tang 120a received in the saw, the teeth in the first intermediate portion 105a tend to wear more quickly than the teeth in the second and third intermediate portions 105b, 105c. Once the teeth in the first intermediate portion 105a are sufficiently worn, the user may remove the saw blade 100 from the saw, and break-off the first intermediate portion 105a from the second intermediate portion 105b, along the score 150 without using additional tools. For example, the user may hold the saw blade with one hand grasping the first intermediate portion 105a and the other hand grasping the second intermediate portion 105b, and may snap off the first intermediate portion 105a along the score 150. The second tang 120b will then be exposed and can be used to couple the remaining portions of the saw blade 100 to the saw. While sawing with the second tang 120b received in the saw, the teeth in the second intermediate portion 105b will tend to wear more quickly than the teeth in the third intermediate portion 105c. Once the teeth in the second intermediate portion 105b are worn, the user may remove the saw blade 100 from the saw, and break-off the second intermediate portion 105b from the third intermediate portion 105c, along the score 160, to expose the third tang 120c. The third tang 120c can then couple the remaining third intermediate portion 105c of the saw blade to a saw. Thus, the life expectancy of the saw blade 100 may be at least approximately three times greater than the life expectancy of a similar ordinary saw blade without multiple tangs.

Referring to FIGS. 5A and 5B, in a second embodiment a saw blade 500 includes an elongated body 502 having a front end 504 facing a frontward direction F, a rear end 506 facing a rearward direction R, and an intermediate portion 505. The intermediate portion 505 includes first, second and third intermediate portions 505a, 505b, and 505c, separated by scores 540, 550. The blade body has a top face 507, as shown in FIG. 1A, and a bottom face 509 as shown in FIG. 1B. An elongated cutting edge 508 having a plurality of teeth 512 (similar to the cutting edge 108 and teeth 112 of the saw blade 100) extends between the front end 504 and the rear end 506 and defines a longitudinal axis X. A back edge 510 extends between the front end 504 and the rear end 506 opposite the cutting edge 508. The saw blade 500 is configured to cut material when the cutting edge 508 is moved in a reciprocating manner. For example, the saw blade 500 may be a reciprocating saw blade, a jigsaw blade, and/or a band saw blade.

A first tang 520a (similar to the first tang 120a of saw blade 100) is coupled to and extends rearward from the rear end 506 of the body 502. A second tang 520b and a third tang 520c (similar to the second tang 120b and third tang 120c of saw blade 100) are defined in the intermediate portion 505 of the saw blade body 502. The second tang 520b is defined by score 540 at a junction between the first intermediate portion 505a and the second intermediate portion 505b. The third tang 520c is defined by score 550 at a junction between the second intermediate portion 505b and the third intermediate portion 505c. The scores 540, 550 allow a user to break off and remove the first intermediate portion 505a from the second intermediate portion 505b and/or the second intermediate portion 505b from the third intermediate portion 505c, without the use of any additional tools, to expose the second tang 520b and/or the third tang 520c, when desired. Each tang 520a, 520b, 520c also includes a round through-hole 528a, 528b, 528c.

Figure 6A:
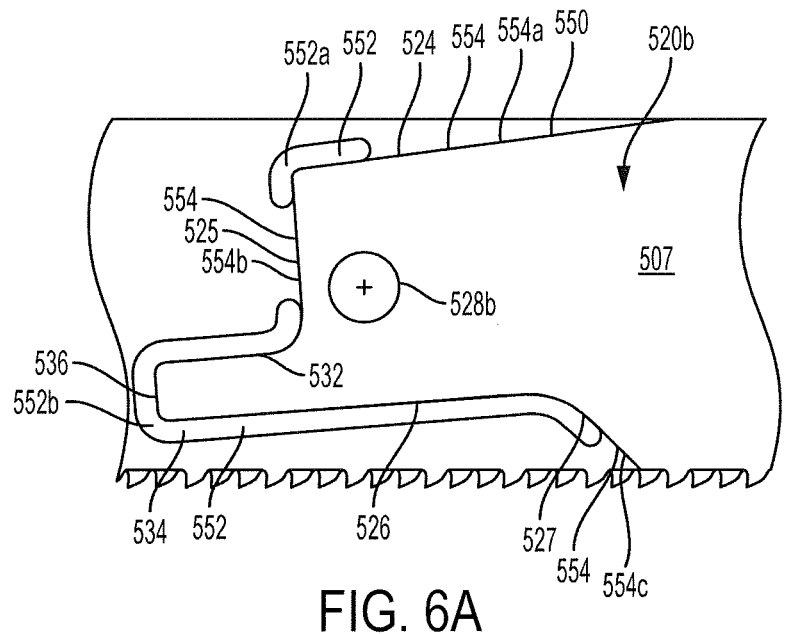
FIG. 6A is a front close up view of a score of the saw blade of FIG. 5A.
Figure 6B:
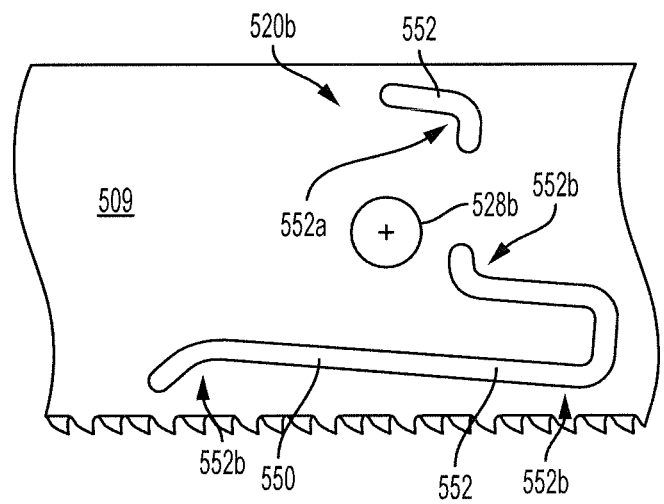
FIG. 6B is a rear close up view of the score of the saw blade of FIG. 5A.

Referring also to FIGS. 6A and 6B, each of the scores 540, 550 include a plurality of through-slots 552 that extend completely through the blade body 502 from the top face 507 to the bottom face 509, and a plurality of non-through-grooves 554 that are defined in the top face 507 but that do not extend through to the bottom face 509. The scores 540, 550 differ from the scores 150, 160 of the saw blade 100 in the arrangement of the through-slots 552 and the non-through-grooves 554. In the embodiment shown in FIGS. 6A and 6B, a first through-slot 552a starts midway along a portion of a first top edge 524 of the tang and wraps around a junction between the first top edge 524 and a first rear edge 525 of the tang. A second through-slot 552b starts at a junction between a first rear edge 525 and a second top edge 532 of the tang, extends along the entire second top edge 532, wraps around a junction between the second top edge 532 and a second rear edge 536 of the tang, extends along the entire second rear edge 536, wraps around a junction between the second rear edge 536 and a second bottom edge 534 of the tang, extends along the entirety of the second bottom edge 534 and a first bottom edge 526 of the tang, and wraps around a junction between the first bottom edge 526 and a rear end 527 of the adjacent intermediate portion. A first non-through groove 554a extends along the first top edge 524 of the tang. A second non-through groove 554b extends along the first rear edge 525 of the tang. A third non-through groove 554c extends along the rear end 527 of the adjacent intermediate portion.

The through-slots 552 and the non-through-grooves 554 of each of the scores 540, 550 are configured so that the scores 540, 550 are structurally strong enough to prevent unintentional breakage and/or separation of the first, second, and/or third intermediate portions 505a, 505b, 505c from one another during sawing, and structurally weak enough to enable a user to break off and remove the first, second, and/or third intermediate portions 505a, 505b, 505c from one another, without the use of any additional tools, to expose the second tang 520b and/or the third tang 520c. The scores 540, 550 divide the saw blade body 502 into approximately equal thirds. In other embodiments, the scores 540, 550 may divide the blade the blade body 502 into unequal thirds. In addition, there may be a different number of scores that define a different number of tangs, and that divide the saw blade body into a different number of sections. Alternatively, the scores may also define tangs having different sizes and/or configurations from one another.

Referring to FIG. 7A, in a third embodiment a saw blade 700 includes an elongated body 702 having a front end 704 facing a frontward direction F, a rear end 706 facing a rearward direction R, and an intermediate portion 705. The intermediate portion 705 includes first, second and third intermediate portions 705a, 705b, and 705c, separated by scores 740, 750. The blade body has a top face 707, as shown in FIG. 7A, and an opposite bottom face (not shown). An elongated cutting edge 708 having a plurality of teeth 712 (similar to the cutting edge 108 and teeth 112 of the saw blade 100) extends between the front end 704 and the rear end 706 and defines a longitudinal axis X. A back edge 710 extends between the front end 704 and the rear end 706 opposite the cutting edge 708. The saw blade 700 is configured to cut material when the cutting edge 708 is moved in a reciprocating manner. For example, the saw blade 700 may be a reciprocating saw blade, a jigsaw blade, and/or a band saw blade.

A first tang 720a is coupled to and extends rearward from the rear end 706 of the body 702. A second tang 720b and a third tang 720c are defined in the intermediate portion 705 of the saw blade body 702. The second tang 720b is defined by score 740 at a junction between the first intermediate portion 705a and the second intermediate portion 705b. The third tang 720c is defined by score 750 at a junction between the second intermediate portion 705b and the third intermediate portion 705c. The scores 740, 750 allow a user to break off and remove the first intermediate portion 705a from the second intermediate portion 705b and/or the second intermediate portion 705b from the third intermediate portion 705c, without the use of any additional tools, to expose the second tang 720b and/or the third tang 720c, when desired.

Figure 7B:
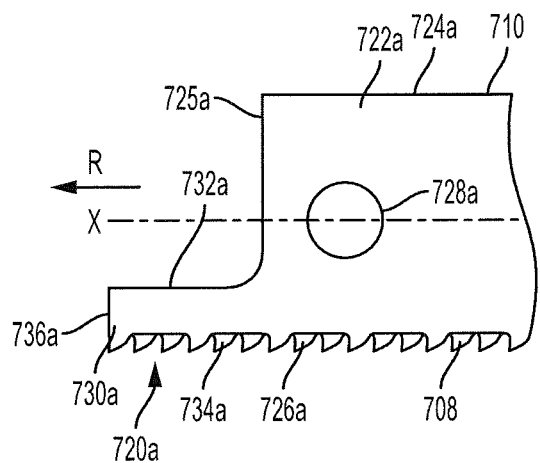
FIG. 7B is a close up view of a tang of the saw blade of FIG. 7A.

Referring also to FIG. 7B, each tang 720a, 720b, 720c has a similar configuration. For convenience only the first tang 720a is illustrated. However, it should be understood that the other tangs 720b, 720c have similar features. The first tang 720a has a body portion 722a defined by a first top edge 724 that is collinear with the back edge 710 of the blade 700, a substantially parallel first bottom edge 726a that is collinear with the cutting edge 708 and includes cutting teeth 712, and a first rear edge 725a. A round opening 728a extends through the body portion 722a of the first tang 720a. The first tang 720a further includes a panhandle portion 730a defined by a second top edge 732a, a second bottom edge 734a that is collinear with the cutting edge 708 and that includes cutting teeth 712, and a second rear edge 736a extending between the second top edge 732a and the second bottom edge 734a. The first bottom edge 126a and the second bottom edge 134a may be collinear with each other. Both the body portion 722a and the panhandle portion 732a of the tang 720a extend in a rearward direction R from the body portion 722a generally parallel to the longitudinal axis X.

Referring also to FIG. 7C, each of the scores 740, 750 has a similar configuration. For convenience only the score 750 on the third tang 720c is illustrated. The score 750 includes a through-slot 752 that extends completely through the blade body 702 from the top face 707 to the bottom face, and a plurality of non-through-grooves 754a, 754b that are defined in the top face 707 but that do not extend through to the bottom face. In the embodiment shown in FIG. 7C, the through-slot 752 wraps around a junction between the first rear edge 725c and the second top edge 732a of the tang 720c, extends along the second top edge 732c of the tang 720c, and wraps around a junction between the second top edge 732c and second rear edge 736c of the tang 720c. The first non-through groove 754a extends along the first rear edge 725c of the tang 720c. The second non-through groove 754b extends along the second rear edge 736c of the tang.

The through-slots 752 and the non-through-grooves 754 of each of the scores 740, 750 are configured so that the scores 740, 750 are structurally strong enough to prevent unintentional breakage and/or separation of the first, second, and/or third intermediate portions 705a, 705b, 705c from one another during sawing, and structurally weak enough to enable a user to break off and remove the first, second, and/or third intermediate portions 705a, 705b, 705c from one another, without the use of any additional tools, to expose the second tang 720b and/or the third tang 720c. The scores 740, 750 divide the saw blade body 702 into approximately equal thirds. In other embodiments, the scores 740, 750 may divide the blade the blade body 702 into unequal thirds. In addition, there may be a different number of scores that define a different number of tangs, and that divide the saw blade body into a different number of sections. Alternatively, the scores may also define tangs having different sizes and/or configurations from one another.

Referring to FIG. 8A, in a fourth embodiment, a saw blade 800 includes an elongated body 802 having a front end 804 facing a frontward direction F, a rear end 806 facing a rearward direction R, and an intermediate portion 805. The intermediate portion 805 includes first, second and third intermediate portions 805a, 805b, and 805c, separated by scores 840, 850. The blade body has a top face 807, as shown in FIG. 8A, and an opposite bottom face (not shown). An elongated cutting edge 808 having a plurality of teeth 812 (similar to the cutting edge 108 and teeth 112 of the saw blade 100) extends between the front end 804 and the rear end 806 and defines a longitudinal axis X. A back edge 810 extends between the front end 804 and the rear end 806 opposite the cutting edge 808. The saw blade 800 is configured to cut material when the cutting edge 808 is moved in a reciprocating manner. For example, the saw blade 800 may be a reciprocating saw blade, a jigsaw blade, and/or a band saw blade.

A first tang 820a is coupled to and extends rearward from the rear end 806 of the body 802. A second tang 820b and a third tang 820c are defined in the intermediate portion 805 of the saw blade body 802. The second tang 820b is defined by score 840 at a junction between the first intermediate portion 805a and the second intermediate portion 805b. The third tang 820c is defined by score 850 at a junction between the second intermediate portion 805b and the third intermediate portion 805c. The scores 840, 850 allow a user to break off and remove the first intermediate portion 805a from the second intermediate portion 805b and/or the second intermediate portion 805b from the third intermediate portion 805c, without the use of any additional tools, to expose the second tang 820b and/or the third tang 820c, when desired.

Figure 8B:
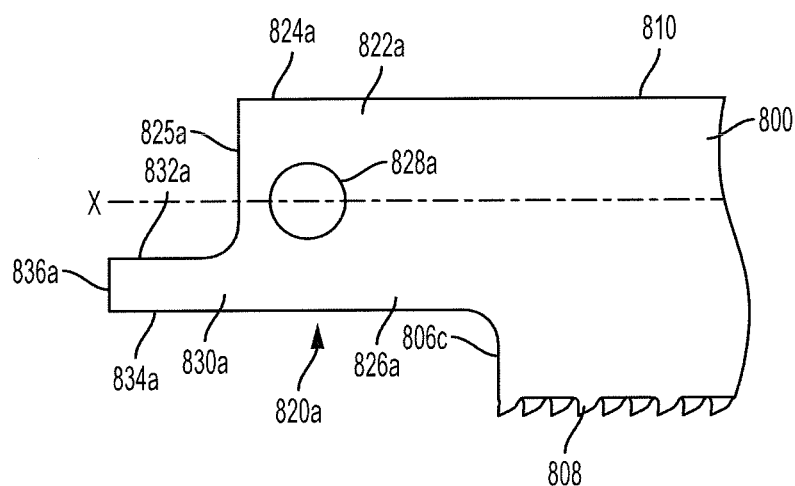
FIG. 8B is a close up view of a tang of the saw blade of FIG. 8A.

Referring also to FIG. 8B, each tang 820a, 820b, 820c has a similar configuration. For convenience only the first tang 820a is illustrated. However, it should be understood that the other tangs 820b, 820c have similar features. The first tang 820a has a body portion 822a defined by a first top edge 824a that is collinear with the back edge 810 of the blade 800, a substantially parallel first bottom edge 826a, and a first rear edge 825a. A round opening 828a extends through the body portion 822a of the first tang 820a. The first tang 820a further includes a panhandle portion 830a defined by a second top edge 832a that is generally parallel to the first top edge 824a, a second bottom edge 834a that is collinear with the first bottom edge 826a, and a second rear edge 836a extending between the second top edge 832a and the second bottom edge 834a. A rear edge 806a of the first intermediate portion 805a extends between the first bottom edge 826a and the cutting edge 808. Both the body portion 822a and the panhandle portion 832a of the tang 820a extend in a rearward direction R from the body portion 822a generally parallel to the longitudinal axis X.

Referring also to FIG. 8C, each of the scores 840, 850 has a similar configuration. For convenience only the score 850 on the third tang 820c is illustrated. The score 850 includes a plurality of through-slots 852a, 852b that extend completely through the blade body 802 from the top face 807 to the bottom face, and a plurality of non-through-grooves 854a, 854b, 854c that are defined in the top face 807 but that do not extend through to the bottom face. In the embodiment shown in FIG. 8C, the first through-slot 852a wraps around a junction between the first rear edge 825c and the second top edge 832a of the tang 820c, extends along the second top edge 832c of the tang 820c, and wraps around a junction between the second top edge 832c and second rear edge 836c of the tang 820c. The second through-slot 852b wraps around a junction between the second rear edge 836c and the second bottom edge 834c, extends along the second bottom edge 834c and the first bottom edge 826c, and wraps around a junction between the first bottom edge 826c and the rear edge 806c of the third intermediate portion 805c. The first non-through groove 854a extends along the first rear edge 825c of the tang 820c. The second non-through groove 854b extends along the second rear edge 836c of the tang. The third non-through groove 854c extends along the rear edge 806c of the third intermediate portion 805c.

The through-slots 852a, 852b and the non-through-grooves 854a, 854b, 854c of each of the scores 840, 850 are configured so that the scores 840, 850 are structurally strong enough to prevent unintentional breakage and/or separation of the first, second, and/or third intermediate portions 805a, 805b, 805c from one another during sawing, and structurally weak enough to enable a user to break off and remove the first, second, and/or third intermediate portions 805a, 805b, 805c from one another, without the use of any additional tools, to expose the second tang 820b and/or the third tang 820c. The scores 840, 850 divide the saw blade body 802 into approximately equal thirds. In other embodiments, the scores 840, 850 may divide the blade body 802 into unequal thirds. In addition, there may be a different number of scores that define a different number of tangs, and that divide the saw blade body into a different number of sections. Alternatively, the scores may also define tangs having different sizes and/or configurations from one another.

Figure 9A:
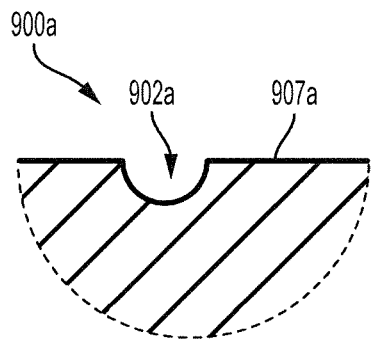
FIG. 9A is cross-sectional view of a first embodiment of a non-through groove for use in the scores of the saw blades of FIGS. 1A-8C.
Figure 9B:
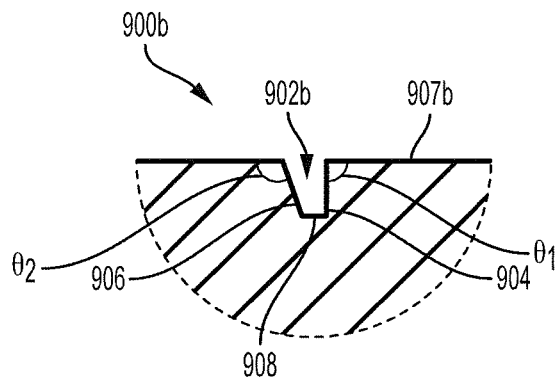
FIG. 9B is cross-sectional view of a second embodiment of a non-through groove for use in the scores of the saw blades of FIGS. 1A-8C.
Figure 9C:
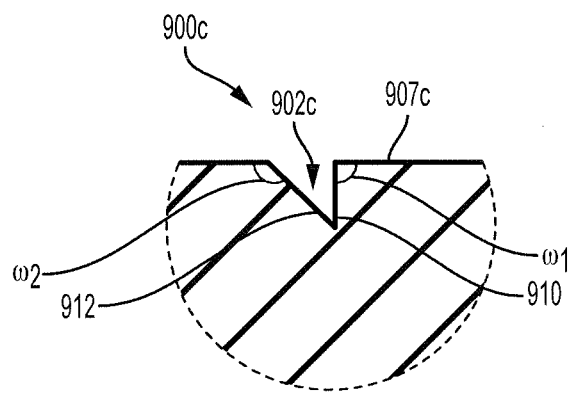
FIG. 9C is cross-sectional view of a third embodiment of a non-through groove for use in the scores of the saw blades of FIGS. 1A-8C.

In an embodiment, the through-slots and the non-through-grooves of the scores in FIGS. 1A-8C may be formed by progressive punch tooling to punch the through-slots and to score the non-through-grooves. In other embodiments, the through-slots and non-through-grooves may be formed by laser cutting, wire/plunge EDM, or laser cutting and scribing. The cross sectional shapes of the non-through-grooves may be dictated by the shape of the punch tooling. For example, in one embodiment, as shown in FIG. 9A, a non-through groove 902a formed a top face 907a of a blade 900a has a semi-circular shape. In another embodiment, as shown in FIG. 9B, a non-through groove 902b formed in a top face 907b of a blade 900b may have a polygonal shape. The groove 902b is defined by a first sidewall 904 that extends at a first angle θ1 to the top face 907b, a second sidewall 906 that extends at a second angle θ2 to the top face 907b, and a bottom wall 908 that extends generally parallel to the top face 907b. The first angle θ1 is approximately 90 to 97 degrees, while the second angle θ2 is approximately 105 to 115 degrees. In another embodiment, as shown in FIG. 9C, a non-through groove 902c formed in a top face 907c of a blade 900c may have a V-shape. The groove 902c is defined by a first sidewall 910 extends at a first angle ω1 to the top face 907c and a second sidewall 912 that extends at a second angle ω2 to the top face 907b. The first angle ω1 is approximately 90 to 97 degrees, while the second angle ω2 is approximately 130 to 140 degrees. In other embodiments, the non-through-grooves may have a U-shaped, square shaped, or rectangular-shaped cross-section.

Numerous modifications may be made to the exemplary implementations described above. These and other implementations are within the scope of this application.

What is claimed is:

1. A saw blade comprising:
   an elongated body having a front body portion and a rear body portion, each body portion having a front end, a rear end, an elongated cutting edge extending between the front end and the rear end and defining a longitudinal axis, and a back edge opposite the cutting edge;
   a first tang coupled to the rear end of the rear body portion and configured to couple the saw blade to a saw, the first tang facing a rearward direction away from the front end of the rear body portion; and
   a second tang defined in an intermediate portion of the body and configured to couple the saw blade to a saw, the second tang also facing the rearward direction,
   wherein the intermediate portion is configured so that an entirety of the second tang can be exposed by breaking off an entirety of the rear body portion in a single integral piece from the body such that the second tang is configured to couple the front body portion to the saw after the second tang has been exposed, and
   wherein, when exposed, the front end of the front body portion has a different configuration than the front end of the rear body portion.

2. The saw blade of claim 1, wherein the intermediate portion includes a first intermediate portion and a second intermediate portion forward of the first intermediate portion, with the second tang disposed at a junction between the first intermediate portion and the rear body portion.

3. The saw blade of claim 2, further comprising a third tang defined at a junction between the second intermediate portion of the body and the front body portion.

4. The saw blade of claim 3, wherein an entirety of the third tang can be exposed by breaking off an entirety of the intermediate portion in a single integral piece from the front body portion.

5. The saw blade of claim 3, wherein the second tang is rearward of the third tang.

6. The saw blade of claim 1, wherein each cutting edge comprises a plurality of teeth that are configured to cut a workpiece only when the cutting edge is moved in a rearward direction along the longitudinal axis.

7. The saw blade of claim 1, wherein the second tang is defined by a score in the body.

8. The saw blade of claim 7, wherein the score includes a through-slot portion that extends through the body and a groove portion that does not extend through the body.

9. A saw blade comprising:
an elongated body having a front body portion and a rear body portion, each body portion having a front end, a rear end, an elongated cutting edge extending between the front end and the rear end and defining a longitudinal axis, and a back edge opposite the cutting edge;
a first tang coupled to the rear end of the rear body portion and configured to couple the saw blade to a saw; and
a second tang defined in an intermediate portion of the body and configured to couple the saw blade to a saw, wherein the intermediate portion is configured so that an entirety of the second tang can be exposed by breaking off an entirety of the rear body in a single integral piece from a portion of the body that includes the first tang such that the second tang is configured to couple the front body portion to the saw after the second tang h been exposed, and
wherein, when exposed, the front end of the front body portion has a different configuration than the front end of the rear body portion.

10. The saw blade of claim 9, wherein the intermediate portion includes a first intermediate portion and a second intermediate portion forward of the first intermediate portion with the second tang disposed at a junction between the first intermediate portion and the rear body portion.

11. The saw blade of claim 10, further comprising a third tang defined at a junction between the second intermediate portion of the body and the front portion of the body.

12. The saw blade of claim 11, wherein an entirety of the third tang can be exposed by breaking off an entirety of the intermediate portion in a single integral piece from the front body portion.

13. The saw blade of claim 11, wherein the second intermediate portion is rearward of the third tang.

14. The saw blade of claim 9, wherein each cutting edge comprises a plurality of teeth that are configured to cut a workpiece only when the cutting edge is moved in a rearward direction along the longitudinal axis.

15. The saw blade of claim 9, wherein the second tang is defined by a score in the body.

16. The saw blade of claim 15, wherein the score includes a through-slot portion that extends through the body and a groove portion that does not extend through the body.

17. A saw blade comprising:
an elongated body having a front body portion and a rear body portion, each body portion having a front end, a rear end, an elongated cutting edge extending between the front end and the rear end and defining a longitudinal axis, and a back edge opposite the cutting edge;
a first tang coupled to the rear end of the rear body portion and configured to couple the saw blade to a saw;
a second tang defined in an intermediate portion of the body and configured to couple the saw blade to a saw, wherein the second tang is defined by a first score in the body that has a through-slot portion that extends through the body and a groove portion that does not extend through the body such that an entirety of the second tang can be exposed by breaking off an entirety of the rear body portion from the body in a single integral piece along the score such that the second tang is configured to couple the front body portion to the saw after the second tang has been exposed, and
wherein, when exposed, the front end of the front body portion has a different configuration than the front end of the rear body portion.

18. The saw blade of claim 17, where the through-slot portion includes a plurality of through-slots that extend through the body and the groove portion includes a plurality of grooves that do not extend through the body.

19. The saw blade of claim 17, wherein the intermediate portion includes a first intermediate portion and a second intermediate portion forward of the first intermediate portion, with the second tang defined at a junction between the first intermediate portion and the rear body portion.

20. The saw blade of claim 19, wherein a third tang is defined at a junction between the second intermediate portion of the body and the front body portion of the body.

21. The saw blade of claim 20, wherein the third tang is defined by a second score in the body.

22. The saw blade of claim 21, wherein the second score includes a through-slot portion that extends through the body and the second portion includes a groove portion that does not extend through the body.

23. The saw blade of claim 19, wherein an entirety of the third tang can be exposed by breaking off an entirety of the intermediate portion in a single integral piece from the front body portion.

24. The saw blade of claim 17, wherein each cutting edge comprises a plurality of teeth that are configured to cut a workpiece only when the cutting edge is moved in a rearward direction along the longitudinal axis.

* * * * *